United States Patent [19]

Patel et al.

[11] 4,266,650
[45] May 12, 1981

[54] COUPLING HINGE FOR TWO CONVEYORS

[75] Inventors: Ravin J. Patel, Parma; John Petro, Cleveland, both of Ohio

[73] Assignee: Bliss & Laughlin Industries Incorporated, Oak Brook, Ill.

[21] Appl. No.: 97,416

[22] Filed: Nov. 26, 1979

[51] Int. Cl.³ .............................................. B65G 13/00
[52] U.S. Cl. .............................. 193/35 TE; 16/128 R
[58] Field of Search ............. 193/35 R, 35 TE, 35 F, 193/35 MD, 35 J; 198/536; 16/128 R, 179, 135

[56] References Cited

U.S. PATENT DOCUMENTS

| | | | |
|---|---|---|---|
| 2,722,243 | 11/1955 | Nagy | 193/35 TE |
| 2,760,617 | 8/1956 | Bowen | 193/35 TE |
| 3,225,879 | 12/1965 | Falcon et al. | 193/35 TE |
| 3,276,558 | 10/1966 | Guska et al. | 193/35 TE |

Primary Examiner—Robert B. Reeves
Assistant Examiner—Gene A. Church
Attorney, Agent, or Firm—Baldwin, Egan, Walling & Fetzer

[57] ABSTRACT

Two longitudinally extending conveyors are connected by a plurality of novel hinge structures for movement between a first position with the two conveyors substantially in line, and a second position with one of the conveyors folded parallel to and on top of the other conveyor. One conveyor called a skate conveyor is referred to as the basic conveyor, while the other shorter conveyor is commonly called a stick conveyor and is herein referred to as the extension conveyor. Each hinge structure comprises a flat coupling hinge leaf generally triangular in shape and having acute apexes respectively one at each end. Each of the hinge structures includes a control link and pivotal connections respectively connected to the basic and extension conveyors, while a control link has a pivotal connection at one end with the hinge leaf near the obtuse apex at one end and is connected to the extension conveyor at its other end. This combination of conveyors is especially adaptable to dispatch a load between two locations which are at different levels.

2 Claims, 4 Drawing Figures

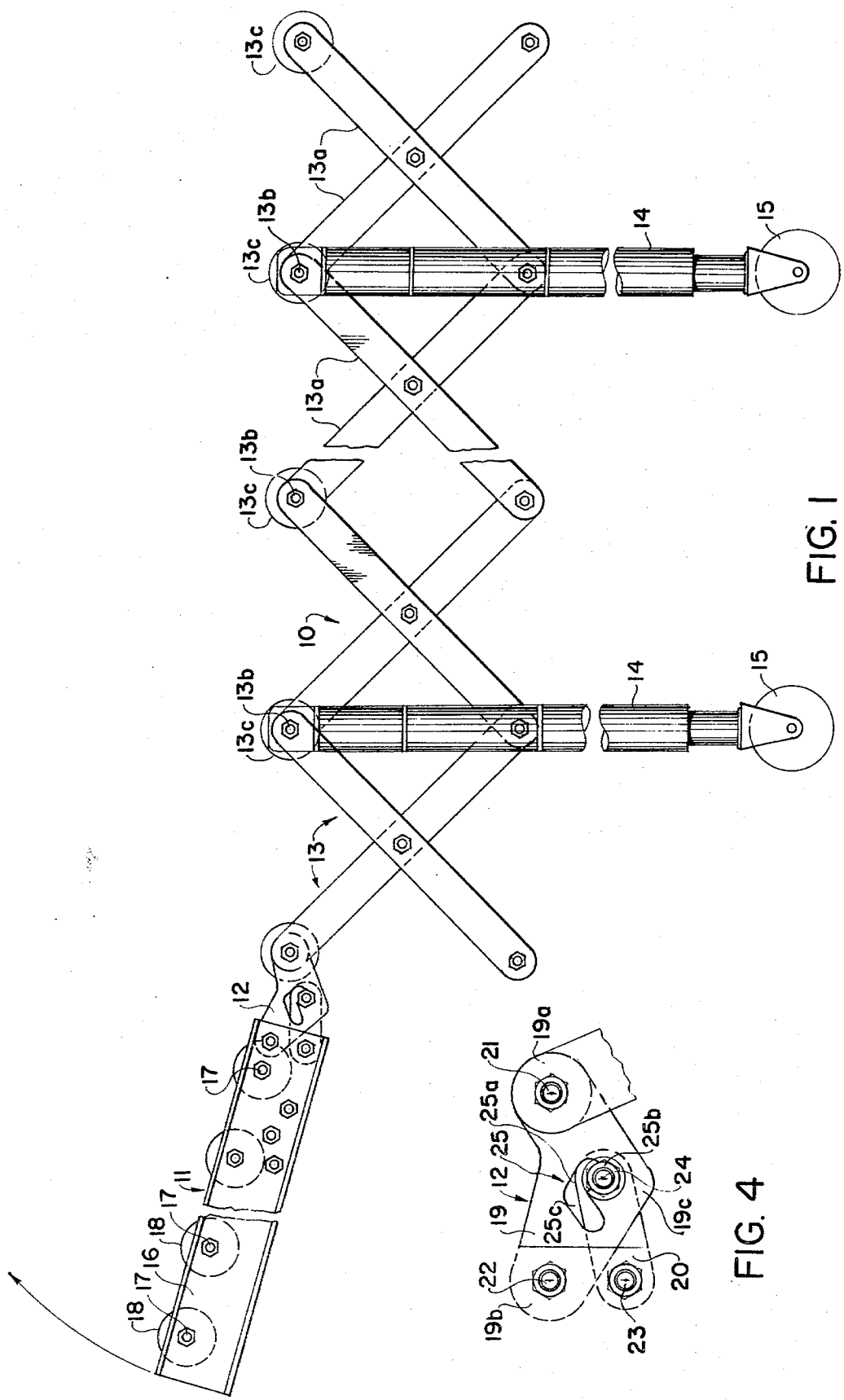

COUPLING HINGE FOR TWO CONVEYORS

FIELD OF THE INVENTION

This invention relates to charging or discharging apparatus for material or article handling of the roadway vehicle loading and unloading type, with external cooperating means of vertical platform alignment type.

PRIOR ART

Applicants are not aware of anything in the prior art for coupling together a basic conveyor and a shorter extension conveyor by hinge structure of the type described and claimed herein.

SUMMARY OF THE INVENTION

The purpose of the present invention is to save valuable floor space in warehouses with the additional advantage of safe operating conditions. An extension conveyor left in unfolded position in the warehouse would create hazardous conditions, as personnel would tend to jump or trip over it. The present invention provides a comparatively simple hinge arrangement whereby the extension conveyor may be moved between a first position with the two conveyors generally substantially in line and a second position with the extension conveyor folded parallel to and on top of the basic conveyor. The present invention provides a plurality of novel hinge structures across the adjacent ends of two longitudinally extending conveyors and each hinge structure includes a flat coupling hinge leaf generally triangular in shape and having acute apexes respectively one at each end of the longer upper edge of the hinge leaf, and one obtuse apex at approximately the center of the lower edge of the hinge leaf and about midway between the two acute apexes. Each of the hinge structures also includes a control link approximately one-half the length of the longer upper edge of the hinge leaf for connecting together two conveyors, one of which is a basic conveyor and the other of which is an extension conveyor. Each of the hinge leaves has pivotal openings for connection of the acute apexes respectively to the basic and extension conveyors and each of the hinge leaves has a control pivotal opening for connection of the obtuse apex to one end of the control link and having at its other end a pivotal connection with the extension conveyor. The pivotal connection between the control link and the hinge leaf provides a locking pin which moves through a control slot in the hinge leaf and this slot has a transmission passageway generally tangential to the pivotal connection to the basic conveyor and the slot has two fork-like passageways communicating with the same side of the transmission passageway and extending generally away from the pivotal connection to the basic conveyor. The construction is such that in a first position with the two conveyors generally in line, the locking pin is closely received in a first of the fork-like passageways, and when the extension conveyor is pivoted about the pivotal connection to the basic conveyor to a second position with the extension conveyor upside down on, and closely adjacent to, the basic conveyor, the locking pin will pass out of the first fork-like passageway and through said transmission passageway and is then closely received in a second of the fork-like passageways.

BRIEF DESCRIPTION OF THE DRAWINGS

FIG. 1 shows a partial side elevational view of a basic conveyor 10 coupled to an extension conveyor 11 by means of the hinge structure 12 which is disclosed herein.

FIG. 4 is an elevational view enlarged of the hinge structure 12.

DESCRIPTION OF PREFERRED EMBODIMENTS

Figure 2:
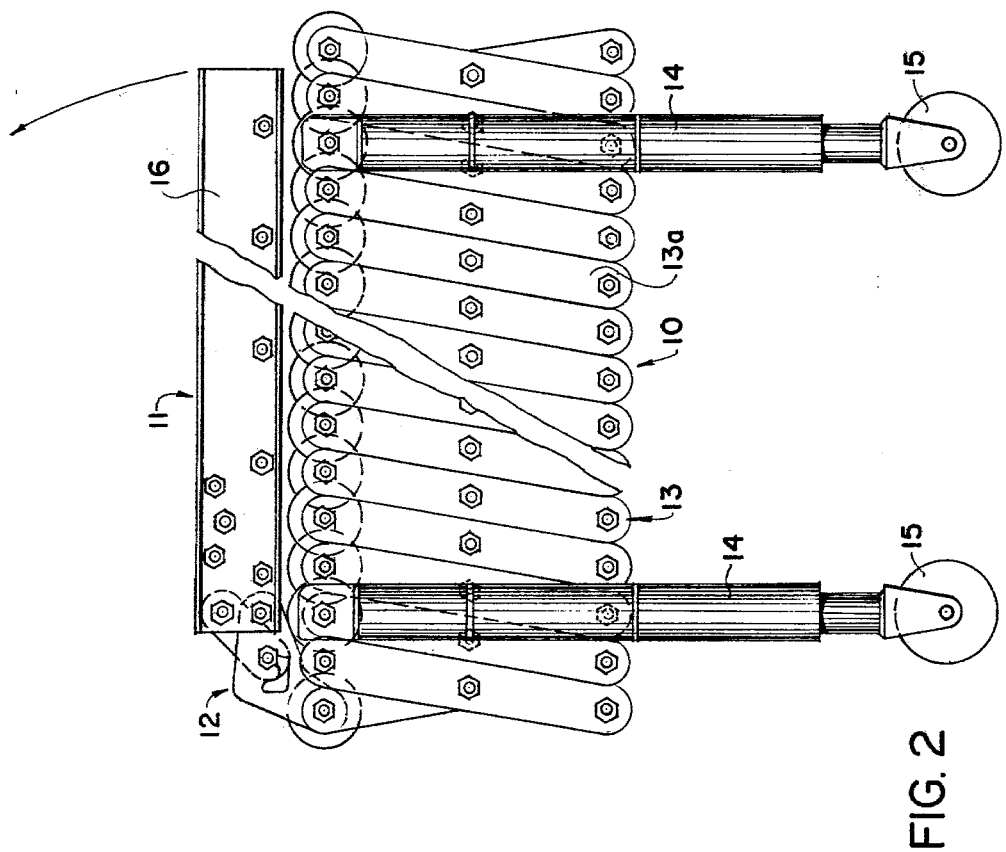
FIG. 2 is a partial side elevational view of the basic conveyor 10, collapsed longitudinally, and with the extension conveyor 11 folded parallel to and on top of the basic conveyor by means of the hinge structure 12.

It should be understood that the hinge structure of this invention may be utilized to connect together any two basic or skate conveyors with a stick or extension conveyor. However, it is heredescribed in connection with the basic conveyor 10 which consists of two side conveyor frame structures 13, each composed of a plurality of lazy tong structure 13a which support at the upper carrying surface of the conveyor a plurality of shafts 13b each of which supports a plurality of rollers 13c spaced across the width of the conveyor which is usually at least several feet wide. This provides a longitudinally extensible conveyor supported on posts 14 and wheels 15 and collapsible from an extended position as shown in FIG. 1 to a collapsed position as shown in FIG. 2. The other conveyor 11, the extension conveyor shown herein comprises longitudinally extending sides 16 which support between them a plurality of shafts 17, each of which carries a plurality of rollers 18 which extend above the upper edge of the side frames as clearly shown in FIG. 1.

Figure 3:
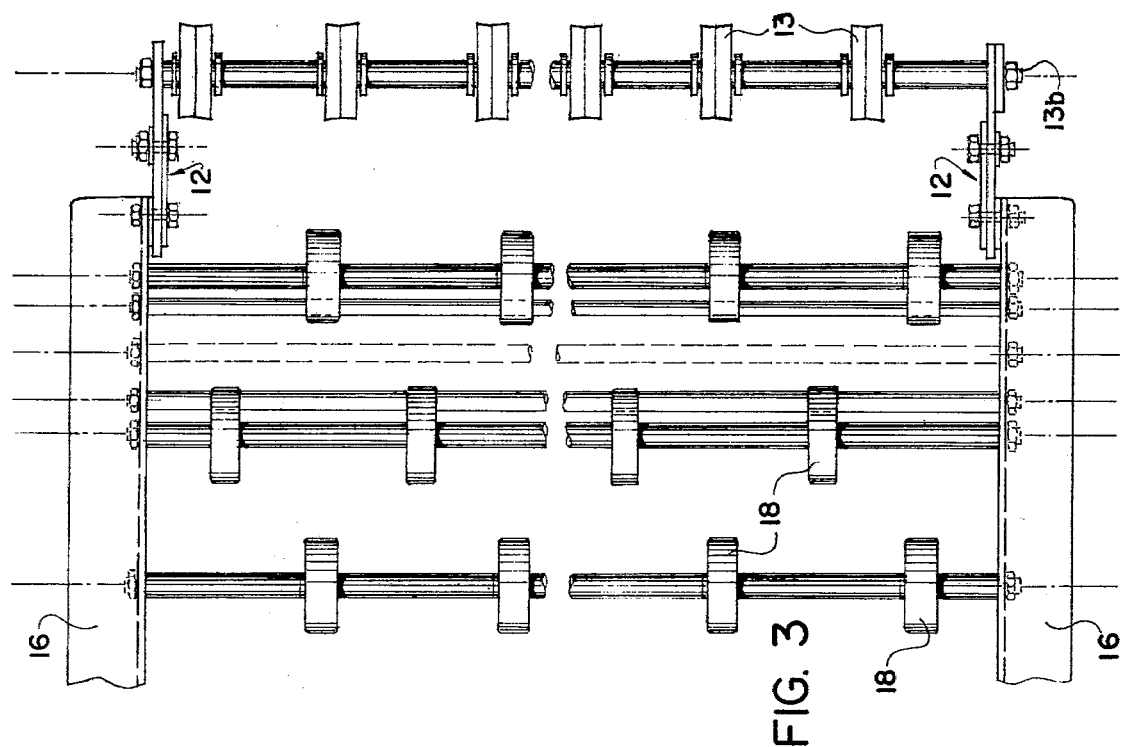
FIG. 3 is a partial top plan view of the structure shown in FIG. 2.

The hinge structure shown at 12 is provided herein at opposite sides of the conveyor structure as seen in FIG. 3 and provides a simple means for folding the extension conveyor 11 from a first position generally in line with the conveyor 10 to a second position with the extension conveyor folded over on top on the basic conveyor 10 as shown in FIG. 2. As described and claimed herein, the first position of the conveyors is described as "generally substantially in line". This is intended to cover a number of different uses of the conveyor structure in which the extension conveyor is usually in a position a little above or a little below an exact in line position but such other positions can not be any more accurately described herein.

The novel construction of the hinge structure utilized in this invention will be described in connection with FIG. 4, it being understood that this may be utilized in as many positions as necessary to smoothly support the two conveyors for positions corresponding to FIGS. 1 and 2, respectively. The hinge structure comprises a flat coupling hinge leaf 19 which is generally triangular in shape and has acute apexes 19a and 19b respectively one at each end of the longer upper edge of the triangular shape leaf, and one obtuse apex 19c at approximately the center of the lower edge of the hinge leaf and about midway between the two acute apexes. Each hinge structure also includes a control link 20 which is approximately one-half of the length of the longer upper edge of the hinge leaf and each of the hinge leaves has a pivotal connection 21 at the acute apex 19a with the basic conveyor 10, and a connection 22 connecting the acute apex 19b with the extension conveyor 11. The control link 20 has a pivotal connection 23 at one end with the extension conveyor 11 and a pivotal 23 at one end with the extension conveyor 11 and a pivotal connection at 24 which provides a locking pin between the control link 20 and the hinge leaf 12. The hinge leaf 12 has a control slot 25 in the hinge leaf through which the locking pin 24 may move. This control slot has a transmission passageway 25a generally tangential to the pivotal connection 21 and this slot has two fork-like passageways 25b and 25c communicating with the same side of the transmission passageway 25a and extending generally away from the pivotal connection 21.

The hinge structure is so constructed and arranged as shown in FIGS. 1 and 2, that in a first position of the two conveyors generally in line, the locking pin 24 is closely received in a first or the fork-like passageways 25b as clearly seen in FIG. 1. Then, when the extension conveyor is folded from the position of FIG. 1 to the position of FIG. 2 with the extension conveyor in a second position upside down, and closely adjacent to, the basic conveyor 10, the locking pin will pass out of the first fork-like passageway 25b and across the transmission passageway 25a and into the second fork-like passageway 25c as clearly seen in FIG. 2 where it locks the two conveyors in the second position.

It should be understood that each of the pivotal connections 21, 22, 23 and 24 comprises hex head bolts, nuts and sleeves to give smooth action during the pivotal motion.

It should be noted in FIG. 1 that the level of the rollers 18 may be at the same level as the tops of the rollers 13c or they may be slanting upwardly or downwardly from such actual level position.

In the position shown in FIG. 1, the combination of the two conveyors can be used to unload a truck in the warehouse without elevated docks. The normal height of the basic conveyor, as extended longitudinally in FIG. 1, is 44 inches in this embodiment. When the extension conveyor is swung up at about at 15° tilt, the extension conveyor will reach the truck floor height of approximately 54 inches to facilitate unloading. In another application, varying slightly from position 1 as shown in FIG. 1, where the dock is higher than the truck body level, the extension conveyor may be moved inside of the truck and the extension conveyor tilted downwards from an exact level position with the basic conveyor, to allow the boxes to be moved into the truck at floor level without difficulty.

What is claimed is:

1. A plurality of novel hinge structures to connect two longitudinally extending conveyors for movement between a first position with said conveyors generally substantially in line and a second position with one of said conveyors folded parallel to and on top of the other conveyor, each of said hinge structures comprising a flat coupling hinge leaf generally triangular in shape and having acute apexes respectively one at each end of a longer upper edge and one obtuse apex at approximately the center of the lower edge about midway between said two acute apexes, each of said hinge structures also including a control link approximately one-half the length of said longer upper edge of said hinge leaf, said two longitudinally extending conveyors including respectively a basic conveyor and an extension conveyor, each of said hinge leaves having pivotal openings for connection of said acute apexes respectively to said basic and extension conveyors, each of said hinge leaves having a control pivotal opening for connection of said obtuse apex to one end of said control link, said control link having a pivotal connection at one end with said hinge leaf at said control pivotal opening and having at its other end a pivotal opening for connection to said extension conveyor, and there being a control slot opening through the central portion of said hinge leaf receiving one end of said control link, said slot having a transmission passageway generally tangential to said pivotal opening for connection to said basic conveyor and said slot having two fork-like passageways communicating with the same side of said transmission passageway and extending generally away from said pivotal opening for connection to said basic conveyor.

2. A plurality of novel hinge structures as defined in claim 1, in combination with a basic conveyor and an extension conveyor, with said hinge structures spaced across the width of said two conveyors and with pivot pins connecting each of said hinge leaves at said two acute apexes respectively with said basic conveyor and said extension conveyor and with each said control link in each hinge structure pivotally connected with said extension conveyor at one end and with said hinge leaf near said obtuse apex at the other end providing a locking pin there, the parts of said hinge structure being so arranged that in said first position of said conveyors generally in line, said locking pin is closely received in a first of said forklike passageways, and when said extension conveyor is pivoted about said pivotal connection with the basic conveyor to a second position with said extension conveyor upside down on, and closely adjacent to, said basic conveyor in said second position, said locking pin will pass out of said first forklike passageway and through said transmission passageway and is then closely received in a second of said forklike passageways.

* * * * *